United States Patent
Shen et al.

(10) Patent No.: US 10,377,858 B2
(45) Date of Patent: Aug. 13, 2019

(54) LOW TOXICITY POLY(ETHERIMIDE-SILOXANE)-AROMATIC POLYKETONE COMPOSITIONS, METHOD OF MANUFACTURE, AND ARTICLES MADE THEREFROM

(71) Applicant: SABIC GLOBAL TECHNOLOGIES B.V., Bergen op Zoom (NL)

(72) Inventors: Liang Shen, Shanghai (CN); Fanshun Meng, Shanghai (CN)

(73) Assignee: SABIC GLOBAL TECHNOLOGIES B.V., Bergen op Zoom (NL)

( * ) Notice: Subject to any disclaimer, the term of this patent is extended or adjusted under 35 U.S.C. 154(b) by 72 days.

(21) Appl. No.: 15/561,647

(22) PCT Filed: Mar. 29, 2016

(86) PCT No.: PCT/IB2016/051775
§ 371 (c)(1),
(2) Date: Sep. 26, 2017

(87) PCT Pub. No.: WO2016/157082
PCT Pub. Date: Oct. 6, 2016

(65) Prior Publication Data
US 2018/0072847 A1    Mar. 15, 2018

Related U.S. Application Data

(60) Provisional application No. 62/140,532, filed on Mar. 31, 2015.

(51) Int. Cl.
| | |
|---|---|
| *C08L 83/10* | (2006.01) |
| *C08L 73/00* | (2006.01) |
| *C08G 73/10* | (2006.01) |
| *C08G 77/455* | (2006.01) |
| *C08L 79/08* | (2006.01) |
| *H01B 3/30* | (2006.01) |
| *H01B 3/46* | (2006.01) |
| *C08L 71/00* | (2006.01) |
| *C08K 3/34* | (2006.01) |
| *C08K 3/36* | (2006.01) |

(52) U.S. Cl.
CPC ....... *C08G 73/1046* (2013.01); *C08G 73/106* (2013.01); *C08G 77/455* (2013.01); *C08K 3/346* (2013.01); *C08K 3/36* (2013.01); *C08L 71/00* (2013.01); *C08L 73/00* (2013.01); *C08L 79/08* (2013.01); *C08L 83/10* (2013.01); *H01B 3/306* (2013.01); *H01B 3/46* (2013.01); *C08G 2650/40* (2013.01); *C08J 2300/22* (2013.01); *C08K 2201/003* (2013.01)

(58) Field of Classification Search
CPC .................................. C08L 83/10; C08L 73/00
See application file for complete search history.

(56) References Cited

U.S. PATENT DOCUMENTS

| | | | |
|---|---|---|---|
| 4,690,997 | A | 9/1987 | Cella et al. |
| 5,660,932 | A | 8/1997 | Durston |
| 7,847,023 | B2 | 12/2010 | Gallucci et al. |
| 8,071,693 | B2 | 12/2011 | Banerjee et al. |
| 2009/0234060 | A1 | 9/2009 | Haralur et al. |
| 2010/0147548 | A1 | 6/2010 | Bhandari et al. |

FOREIGN PATENT DOCUMENTS

| | | |
|---|---|---|
| WO | 2008112742 A1 | 9/2008 |
| WO | 2016137878 | 9/2016 |
| WO | 2016157096 | 10/2016 |
| WO | 2016160814 | 10/2016 |

OTHER PUBLICATIONS

International Search Report for International Application No. PCT/IB2016/051775; International Filing Date: Mar. 29, 2016; dated Jun. 8, 2016; 5 pages.
International Search Report for International Application No. PCT/IB2016/051804; International Filing Date: Mar. 30, 2017; dated May 30, 2016; 5 pages.
International Search Report for International Application No. PCT/US20161024727; International Filing Date: Mar. 29, 2016; dated Jun. 6, 2016; 5 pages.
Written Opinion of the International Searching Authority for International Application No. PCT/IB2016/051775; International Filing Date: Mar. 29, 2016; dated Jun. 8, 2016; 6 pages.
Written Opinion of the International Searching Authority for International Application No. PCT/IB2016/051804; International Filing Date: Mar. 30, 2017; dated May 30, 2016; 6 pages.
Written Opinion of The International Searching Authority for International Application No. PCT/US2016/024727; International Filing Date: Mar. 29, 2016; dated Jun. 6, 2016; 6 pages.

*Primary Examiner* — Caixia Lu
(74) *Attorney, Agent, or Firm* — Cantor Colburn LLP

(57) ABSTRACT

A thermoplastic composition includes a poly(etherimide-siloxane) copolymer having a siloxane content of more than 0 to less than 50 weight percent based on the total weight of the poly(etherimide-siloxane) copolymer; an aromatic polyketone; and a mineral filler having a particle diameter of 0.1-2 micrometers. The thermoplastic composition has a lower toxicity index than the same composition without the aromatic polyketone, the mineral filler, or both, as determined in accordance with EN53505.

19 Claims, 1 Drawing Sheet

LOW TOXICITY POLY(ETHERIMIDE-SILOXANE)-AROMATIC POLYKETONE COMPOSITIONS, METHOD OF MANUFACTURE, AND ARTICLES MADE THEREFROM

CROSS-REFERENCE TO RELATED APPLICATIONS

This application is a National Stage application of PCT/IB2016/051775, filed Mar. 29, 2016, which claims the benefit of U.S. Provisional Application No. 62/140,532, filed Mar. 31, 2015, both of which are incorporated by reference herein in their entirety.

BACKGROUND

This disclosure relates to a thermoplastic composition comprising poly(etherimide-siloxane) copolymers, methods of manufacture, and articles containing the thermoplastic compositions.

Poly(etherimide-siloxane) copolymers (also known as polysiloxane/polyimide block copolymers) have been explored in a wide variety of applications requiring flame retardance, for example as coatings for electrical wires, due to their flame resistant properties and high temperature stability. The copolymers are attractive for applications of this type because the polyetherimide blocks impart desirable properties such as high temperature resistance, high strength, good wear resistance, good flame retardant properties, and low smoke density, while the polysiloxane blocks contribute flexibility, good low-temperature properties, and temperature stability. Even so, it has been difficult to obtain compositions that meet all of the requirements of the most stringent flammability standards, for example the European EN standards.

Aromatic polyketones such as polyaryletherketones are crystalline polymers valued due to their resistance to high temperatures, crystallizability, melt extrudability, and injection moldability, thereby making them versatile and useful in many applications. Crystallization of polymers is an important feature in polymer processing, because the structure developed during crystallization can affect the mechanical and physical properties of the polymer product. The crystallization of polymers under processing conditions is essential for optimizing the processing conditions to obtain a product with desired properties. Aromatic polyketones, such as polyaryletherketones frequently suffer from brittleness, e.g., poor toughness (low ductility), making them unsuitable for many applications. There has been a long felt need to develop a composition that has a ductility that is better than aromatic polyketones and still retains the advantageous processing features found in polyaryletherketone compositions. Polyaryletherketone blends have sought to solve this problem, but these blends have suffered from drawbacks such as insufficient ductility, delamination and the like.

Accordingly, there remains a need in the art for improved thermoplastic compositions having the desired combination of physical properties, including low flammability, low toxicity, and high temperature stability. It has been particularly difficult to obtain these characteristics in combination with high impact strength. It would further be particularly useful if the compositions also have low flexural modulus and high tensile elongation. For some applications, improved tear strength in combination with the foregoing properties would be especially useful.

BRIEF DESCRIPTION

A thermoplastic compositions comprises 25 to 95 weight percent poly(etherimide-siloxane) copolymer having a siloxane content of more than 0 to less than 50 weight percent based on the total weight of the poly(etherimide-siloxane) copolymer; 5 to 85 weight percent of an aromatic polyketone; and greater than 0 to 15 weight percent of a mineral filler preferably having a particle diameter of 0.1-2 micrometers; wherein the mineral filler comprises kaolin clay, talc, or a combination comprising at least one of the foregoing; wherein all weight percents are based on the total weight of the composition; and wherein the thermoplastic composition has a lower toxicity index than the same composition without the aromatic polyketone, the mineral filler, or both, as determined in accordance with EN 53505, or the thermoplastic composition has a lower HCN/benzene ratio than the same thermoplastic composition not including the aromatic polyketone, the mineral filler, or both.

In another embodiment, a thermoplastic composition comprises, based on the total weight of the composition, 25 to 95 weight percent poly(etherimide-siloxane) copolymer having a siloxane content of more than 0 to less than 50 weight percent based on the total weight of the poly(etherimide-siloxane) copolymer; and greater than 0 to 15 weight percent of kaolin clay, talc, or a combination comprising at least one of the foregoing; wherein the thermoplastic composition has a lower HCN/benzene ratio than the same thermoplastic composition not including the mineral filler, a lower toxicity index than the same composition without the mineral filler, or both, as determined in accordance with EN 53505, or both.

Alternatively, thermoplastic compositions comprise, based on the total weight of the composition, 25 to 95 weight percent poly(etherimide-siloxane) copolymer having a siloxane content of more than 0 to less than 50 weight percent based on the total weight of the poly(etherimide-siloxane) copolymer; and 5 to 75 weight percent of an aromatic polyketone, wherein the thermoplastic composition has a lower toxicity index than the same composition without the aromatic polyketone, as determined in accordance with EN 53505, or the thermoplastic composition has a lower HCN/benzene ratio than the same thermoplastic composition not including the aromatic polyketone, or both.

Articles comprising the foregoing compositions are also described, including electrical wires comprising a conductor wire and a covering disposed over the conductor wire, wherein the covering comprises the thermoplastic composition.

An electrical wire comprises a conductor wire and a covering disposed over the conductor wire, wherein the covering comprises the thermoplastic composition, and wherein the thermoplastic composition coating the conductor wire has one or more of the following properties: a tensile stress of greater than 30 MPa, determined according to UL-1581 after 24 hours at 23° C.; and a tensile elongation of greater than 100%, determined according to UL-1581 after 24 hours at 23° C.

Articles comprising the electrical wire are also disclosed.

The above described and other features are exemplified by the following Figures and Detailed Description.

BRIEF DESCRIPTION OF THE DRAWINGS

The following Figures are exemplary embodiments.

DETAILED DESCRIPTION

Figure 1:
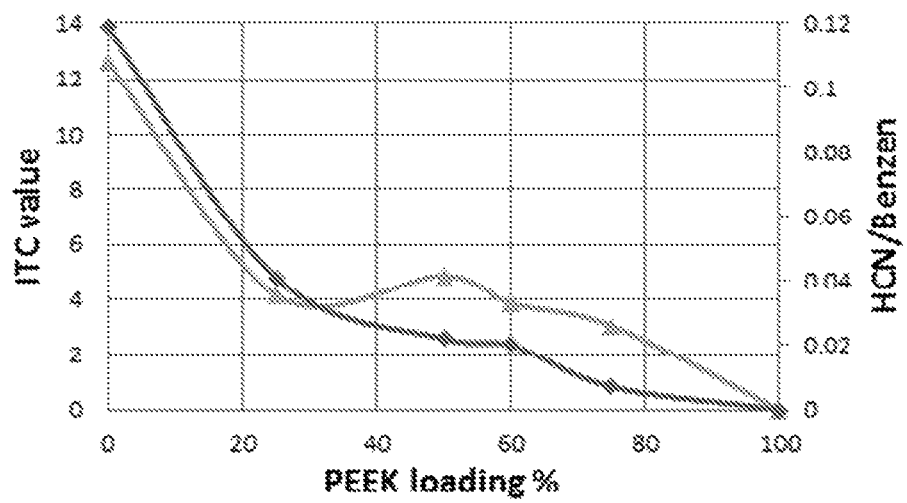
FIG. 1 shows toxicity data for thermoplastic compositions comprising poly(etherimide-siloxane) copolymers and varying amounts of aromatic polyketone. The ITC value is provided for each composition on the left axis (triangles) were determined according to EN50305 test methods, and the ratio of the peak height of HCN/benzene is provided for each composition on the right axis (diamonds), determined using a GC-MS test method, as described herein.

Described herein are thermoplastic compositions comprising a poly(etherimide-siloxane) copolymer, and an aromatic polyketone, a mineral filler, or both. The inventors hereof have unexpectedly discovered that combinations of poly(etherimide-siloxane)s with specific aromatic polyketones, mineral fillers, or both can provide compositions having improved physical properties, and in particular and improved ITC values in EN50305 flammability testing. The compositions are particularly useful for the preparation of articles that need to meet stringent flammability standards, such as electrical wire coatings for use in high heat applications.

The thermoplastic composition comprises a poly(etherimide-siloxane) and optionally aromatic polyketone. The aromatic polyketone comprises repeating units of formula (1)

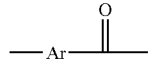
(1)

wherein Ar is independently at each occurrence a substituted or unsubstituted, monocyclic or polycyclic aromatic group having 6 to 30 carbons. Exemplary Ar groups include, but are not limited to, phenyl, tolyl, naphthyl, and biphenyl.

The aromatic polyketone can be a polyaryletherketone in which case it comprises repeating units of Formula (1) and repeating units of formula (2)

—Ar—O—  (2)

wherein Ar is defined as above. For example, the aromatic polyketone can comprise a polyetherketone. Polyetherketones comprise repeating units of formula (3)

(3)

wherein Ar is defined as above and $Ar^1$ is independently at each occurrence a substituted or unsubstituted, monocyclic or polycyclic aromatic group having 6 to 30 carbons. Ar can be the same as or different from $Ar^1$. In some embodiments Ar and $Ar^1$ are phenyl groups.

In some embodiments, the aromatic polyketone can comprise a polyetheretherketone. Polyetheretherketones comprise repeating units of formula (4)

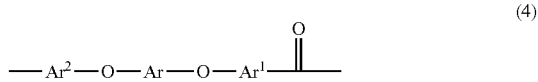
(4)

wherein Ar and $Ar^1$ are defined as above. $Ar^2$ is independently at each occurrence a substituted or unsubstituted, monocyclic or polycyclic aromatic group having 6 to 30 carbons. Ar, $Ar^1$, and $Ar^2$ can be the same as or different from each other. Additionally, two of Ar, $Ar^1$, and $Ar^2$ can be the same as each other and the third can be different. In some embodiments Ar, $Ar^1$, and $Ar^2$ are phenyl groups.

Aromatic polyketones are generally known, with many examples being commercially available. Examples of commercially available aromatic polyketones include those sold under the trade name PEEK™, available from VICTREX.

The aromatic polyketone can be present in an amount of 5 to 75 weight percent (wt. %) based on the total weight of the composition. Within this range, the aromatic polyketone can be present in an amount greater than or equal to 5 wt %, or greater than or equal to 10 wt %, or greater than or equal to 25 wt %. Also within this range the aromatic polyketone can be present in an amount less than or equal to 75 wt %, or less than or equal to 50 wt %.

The poly(etherimide-siloxane) copolymers comprise polyetherimide units and polysiloxane units, for example 5 to 1000, or 10 to 500, etherimide units and siloxane units. The polyetherimide units comprise structural units of formula (5)

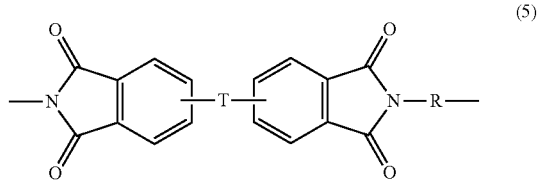
(5)

wherein each R is the same or different, and is a substituted or unsubstituted divalent organic group, such as a $C_{6-20}$ aromatic hydrocarbon group or a halogenated derivative thereof, a straight or branched chain $C_{2-20}$ alkylene group or a halogenated derivative thereof, a $C_{3-8}$ cycloalkylene group or halogenated derivative thereof, in particular a divalent group of formula (6)

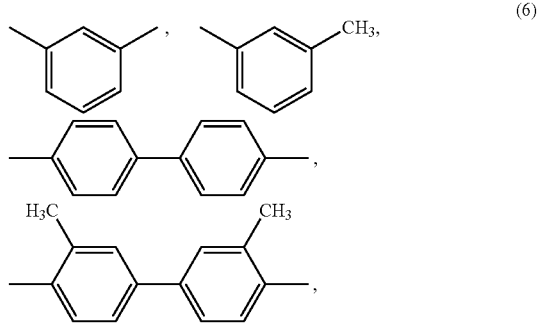
(6)

-continued

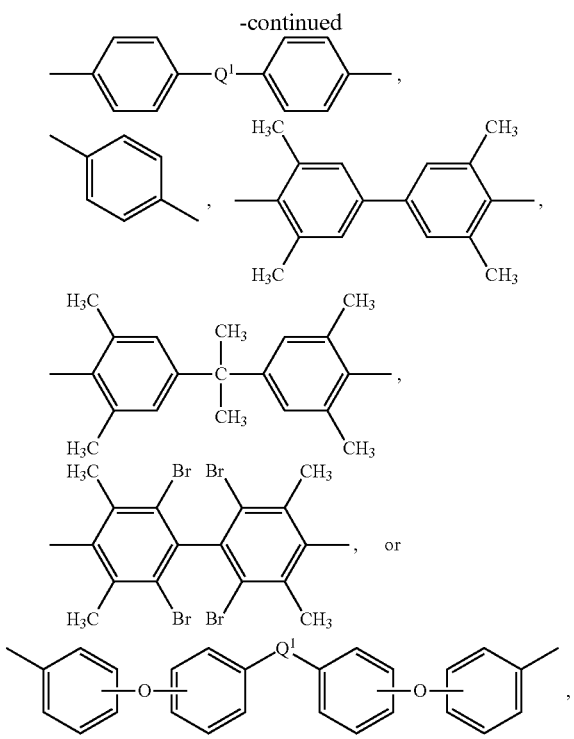

wherein $Q^1$ is —O—, —S—, —C(O)—, —SO$_2$—, —SO—, —C$_y$H$_{2y}$— wherein y is an integer from 1 to 5 or a halogenated derivative thereof (which includes perfluoroalkylene groups), or —(C$_6$H$_{10}$)$_z$— wherein z is an integer from 1 to 4. In an embodiment R is m-phenylene, p-phenylene, or a diaryl sulfone.

Further in formula (5), T is —O— or a group of the formula —O—Z—O— wherein the divalent bonds of the —O— or the —O—Z—O— group are in the 3,3', 3,4', 4,3', or the 4,4' positions. The group Z in —O—Z—O— of formula (1) is also a substituted or unsubstituted divalent organic group, and can be an aromatic C$_{6-24}$ monocyclic or polycyclic moiety optionally substituted with 1 to 6 C$_{1-8}$ alkyl groups, 1 to 8 halogen atoms, or a combination thereof, provided that the valence of Z is not exceeded. Exemplary groups Z include groups derived from a dihydroxy compound of formula (7)

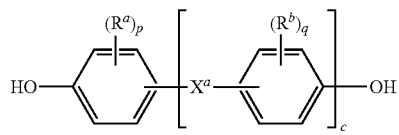  (7)

wherein $R^a$ and $R^b$ can be the same or different and are a halogen atom or a monovalent C$_{1-6}$ alkyl group, for example; p and q are each independently integers of 0 to 4; c is 0 to 4; and $X^a$ is a bridging group connecting the hydroxy-substituted aromatic groups, where the bridging group and the hydroxy substituent of each C$_6$ arylene group are disposed ortho, meta, or para (specifically para) to each other on the C$_6$ arylene group. The bridging group $X^a$ can be a single bond, —O—, —S—, —S(O)—, —S(O)$_2$—, —C(O)—, or a C$_{1-18}$ organic bridging group. The C$_{1-18}$ organic bridging group can be cyclic or acyclic, aromatic or non-aromatic, and can further comprise heteroatoms such as halogens, oxygen, nitrogen, sulfur, silicon, or phosphorous. The C$_{1-18}$ organic group can be disposed such that the C$_6$ arylene groups connected thereto are each connected to a common alkylidene carbon or to different carbons of the C$_{1-18}$ organic bridging group. A specific example of a group Z is a divalent group of formula (7a)

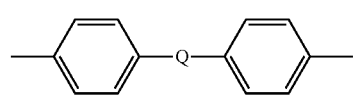  (7a)

wherein Q is —O—, —S—, —C(O)—, —SO$_2$—, —SO—, or —C$_y$H$_{2y}$— wherein y is an integer from 1 to 5 or a halogenated derivative thereof (including a perfluoroalkylene group). In a specific embodiment Z is a derived from bisphenol A, such that Q in formula (7a) is 2,2-isopropylidene.

In an embodiment in formula (5), R is m-phenylene or p-phenylene and T is —O—Z—O— wherein Z is a divalent group of formula (7a). Alternatively, R is m-phenylene or p-phenylene and T is —O—Z—O— wherein Z is a divalent group of formula (7a) and Q is 2,2-isopropylidene.

The polyetherimide blocks can be prepared by any of the methods well known to those skilled in the art, including the reaction of an aromatic bis(ether anhydride) of formula (8)

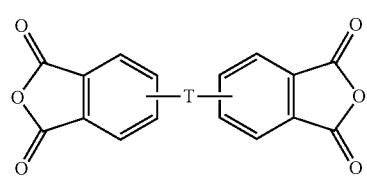  (8)

with an organic diamine of formula (9)

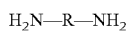  (9)

wherein T and R are defined as described above. Copolymers of the polyetherimides can be manufactured using a combination of an aromatic bis(ether anhydride) of formula (8) and a different bis(anhydride), for example a bis(anhydride) wherein T does not contain an ether functionality, for example T is a sulfone.

Illustrative examples of bis(anhydride)s include 3,3-bis[4-(3,4-dicarboxyphenoxy)phenyl]propane dianhydride; 4,4'-bis(3,4-dicarboxyphenoxy)diphenyl ether dianhydride; 4,4'-bis(3,4-dicarboxyphenoxy)diphenyl sulfide dianhydride; 4,4'-bis(3,4-dicarboxyphenoxy)benzophenone dianhydride; 4,4'-bis(3,4-dicarboxyphenoxy)diphenyl sulfone dianhydride; 2,2-bis[4-(2,3-dicarboxyphenoxy)phenyl]propane dianhydride; 4,4'-bis(2,3-dicarboxyphenoxy)diphenyl ether dianhydride; 4,4'-bis(2,3-dicarboxyphenoxy)diphenyl sulfide dianhydride; 4,4'-bis(2,3-dicarboxyphenoxy)benzophenone dianhydride; 4,4'-bis(2,3-dicarboxyphenoxy)diphenyl sulfone dianhydride; 4-(2,3-dicarboxyphenoxy)-4'-(3,4-dicarboxyphenoxy)diphenyl-2,2-propane dianhydride; 4-(2,3-dicarboxyphenoxy)-4'-(3,4-dicarboxyphenoxy)diphenyl ether dianhydride; 4-(2,3-dicarboxyphenoxy)-4'-(3,4-dicarboxyphenoxy)diphenyl sulfide dianhydride; 4-(2,3-dicarboxyphenoxy)-4'-(3,4-dicarboxyphenoxy)benzophenone dianhydride; and, 4-(2,3-dicarboxyphenoxy)-4'-(3,4- dicarboxyphenoxy)diphenyl sulfone dianhydride, as well as various combinations thereof.

Examples of organic diamines include ethylenediamine, propylenediamine, trimethylenediamine, diethylenetriamine, triethylene tetramine, hexamethylenediamine, heptamethylenediamine, octamethylenediamine, nonamethylenediamine, decamethylenediamine, 1,12-dodecanediamine, 1,18-octadecanediamine, 3-methylheptamethylenediamine, 4,4-dimethylheptamethylenediamine, 4-methylnonamethylenediamine, 5-methylnonamethylenediamine, 2,5-dimethylhexamethylenediamine, 2,5-dimethylheptamethylenediamine, 2, 2-dimethylpropylenediamine, N-methyl-bis (3-aminopropyl) amine, 3-methoxyhexamethylenediamine, 1,2-bis(3-aminopropoxy) ethane, bis(3-aminopropyl) sulfide, 1,4-cyclohexanediamine, bis-(4-aminocyclohexyl) methane, m-phenylenediamine, p-phenylenediamine, 2,4-diaminotoluene, 2,6-diaminotoluene, m-xylylenediamine, p-xylylenediamine, 2-methyl-4,6-diethyl-1,3-phenylene-diamine, 5-methyl-4,6-diethyl-1,3-phenylene-diamine, benzidine, 3,3'-dimethylbenzidine, 3,3'-dimethoxybenzidine, 1,5-diaminonaphthalene, bis(4-aminophenyl) methane, bis(2-chloro-4-amino-3,5-diethylphenyl) methane, bis(4-aminophenyl) propane, 2,4-bis(p-amino-t-butyl) toluene, bis(p-amino-t-butylphenyl) ether, bis(p-methyl-o-aminophenyl) benzene, bis(p-methyl-o-aminopentyl) benzene, 1, 3-diamino-4-isopropylbenzene, bis(4-aminophenyl) sulfide, bis-(4-aminophenyl) sulfone, and bis(4-aminophenyl) ether. Combinations of these compounds can also be used. In some embodiments the organic diamine is m-phenylenediamine, p-phenylenediamine, sulfonyl dianiline, or a combination comprising one or more of the foregoing.

The siloxane blocks contain units of formula (10)

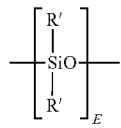

(10)

wherein each R' is independently a $C_{1-13}$ monovalent hydrocarbyl group. For example, each R' can independently be a $C_{1-13}$ alkyl group, $C_{1-13}$ alkoxy group, $C_{2-13}$ alkenyl group, $C_{2-13}$ alkenyloxy group, $C_{3-6}$ cycloalkyl group, $C_{3-6}$ cycloalkoxy group, $C_{6-14}$ aryl group, $C_{6-10}$ aryloxy group, $C_{7-13}$ arylalkyl group, $C_{7-13}$ arylalkoxy group, $C_{7-13}$ alkylaryl group, or $C_{7-13}$ alkylaryloxy group. The foregoing groups can be fully or partially halogenated with fluorine, chlorine, bromine, or iodine, or a combination comprising at least one of the foregoing. In an embodiment no bromine or chlorine is present, and in another embodiment no halogens are present. Combinations of the foregoing R groups can be used in the same copolymer. In an embodiment, the polysiloxane blocks comprises R' groups that have minimal hydrocarbon content. In a specific embodiment, an R' group with a minimal hydrocarbon content is a methyl group.

The poly(etherimide-siloxane)s can be formed by polymerization of an aromatic bisanhydride (8) and a diamine component comprising an organic diamine (9) as described above or mixture of diamines, and a polysiloxane diamine of formula (11)

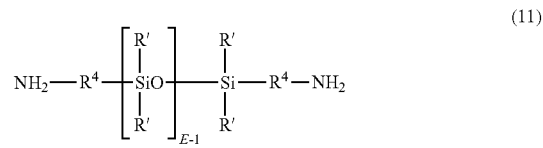

(11)

wherein R' and E are as described in formula (10), and each $R^4$ is independently a $C_2$-$C_{20}$ hydrocarbon moiety, in particular a $C_2$-$C_{20}$ arylene, alkylene, or arylenealkylene group. In an embodiment $R^4$ is a $C_2$-$C_{20}$ alkylene group, specifically a $C_2$-$C_{10}$ alkylene group such as propylene, and E has an average value of 5 to 100, 5 to 75, 5 to 60, 5 to 15, or 15 to 40. Procedures for making the polysiloxane diamines of formula (11) are well known in the art.

In some poly(etherimide-siloxane) copolymers the diamine component used in the manufacture of the copolymers can contain 10 to 90 mole percent (mol %), or 20 to 50 mol %, or 25 to 40 mol % of polysiloxane diamine (11) and 10 to 90 mol %, or 50 to 80 mol %, or 60 to 75 mol % of diamine (9), for example as described in U.S. Pat. No. 4,404,350. The diamine components can be physically mixed prior to reaction with the bisanhydride(s), thus forming a substantially random copolymer. Alternatively, block or alternating copolymers can be formed by selective reaction of (9) and (11) with aromatic bis(ether anhydrides) (8), to make polyimide blocks that are subsequently reacted together. Thus, the poly(etherimide-siloxane) copolymer can be a block, random, or graft copolymer. Block poly(etherimide-siloxane) copolymers comprise etherimide blocks and siloxane blocks in the polymer backbone. The etherimide blocks and the siloxane blocks can be present in random order, as blocks (i.e., AABB), alternating (i.e., ABAB), or a combination thereof. Graft poly(etherimide-siloxane) copolymers are non-linear copolymers comprising the siloxane blocks connected to linear or branched polymer backbone comprising etherimide blocks.

Examples of specific poly(etherimide-siloxane)s are described in U.S. Pat. Nos. 4,404,350, 4,808,686 and 4,690,997. In an embodiment, the poly(etherimide-siloxane) has units of formula (12)

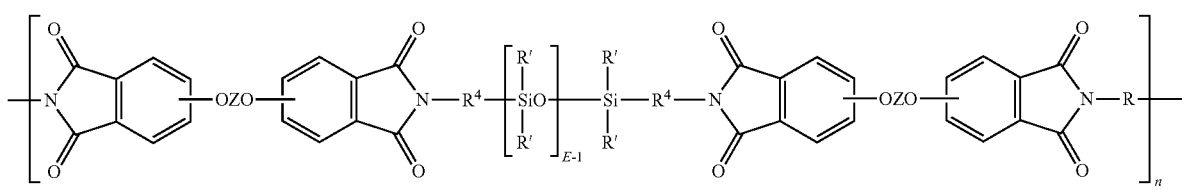

(12)

wherein R' and E of the siloxane are as in formula (10), the R and Z of the imide are as in formula (5), $R^4$ is the same as $R^4$ as in formula (11), and n is an integer from 5 to 100. In a specific embodiment, the R is a phenylene, Z is a residue of bisphenol A, $R^4$ is n-propylene, E is 2 to 50, 5 to 30, or 10 to 40, n is 5 to 100, and each R' of the siloxane is methyl.

The relative amount of polysiloxane units and etherimide units in the poly(etherimide-siloxane) depends on the desired properties, and are selected using the guidelines provided herein. In particular, the poly(etherimide-siloxane) copolymer is selected to have a certain average value of E, and is selected and used in amount effective to provide the desired weight percent (wt %) of siloxane units in the thermoplastic composition. In an embodiment the poly (etherimide-siloxane) comprises 5 to 50 wt %, 10 to 40 wt %, or 20 to 35 wt % siloxane units, based on the total weight of the poly(etherimide-siloxane). In some embodiments the polysiloxane block of the copolymer has a number average molecular weight (Mn) of 300 to 3000 grams/mole (Daltons).

The poly(etherimide-siloxane)s can have a melt index of 0.1 to 10 grams per minute (g/min), as measured by American Society for Testing Materials (ASTM) D1238 at 340 to 370° C., using a 6.7 kilogram (kg) weight. In some embodiments, the polyetherimide polymer has a weight average molecular weight (Mw) of 1,000 to 150,000 Daltons, or 10,000 to 80,000 Daltons, as measured by gel permeation chromatography, using polystyrene standards. Such polyetherimide polymers typically have an intrinsic viscosity greater than 0.2 deciliters per gram (dl/g), or, more specifically, 0.35 to 0.7 dl/g as measured in m-cresol at 25° C. The poly(etherimide-siloxane) copolymer can have a number average molecular weight (Mn) of 5,000 to 50,000 Daltons, or 10,000 to 30,000 Daltons.

The thermoplastic composition can comprise a combination of two or more poly(etherimide-siloxane) copolymers. The copolymers can be used in any proportion. For example, when two copolymers are used the weight ratio of the first copolymer to the second copolymer can be 1:99 to 99:1. Ternary blends and higher are also contemplated.

The poly(etherimide-siloxane) copolymer can be present in an amount of 5 to 99 wt %, for example 25 to 95 wt % based on the total weight of the composition. Within this range the poly(etherimide-siloxane) copolymer can be present in an amount greater than or equal to 10 wt %, or greater than or equal to 25 wt %. Also within this range the poly(etherimide-siloxane) copolymer can be present in an amount less than or equal to 95 wt %, or less than or equal to 90 wt %, or less than or equal to 75 wt %.

The thermoplastic composition can have a siloxane content, based on the combined weight of the poly(etherimide-siloxane) copolymer and the aromatic polyketone, of 1 to 25 wt %. Within this range the siloxane content can be greater than or equal to 5 wt %, or greater than or equal to 7 wt %. Also within this range the siloxane content can be less than or equal to 23 wt %.

The thermoplastic composition can optionally further comprise a filler. Examples of fillers include glass beads (hollow and/or solid), glass flake, milled glass, glass fibers, talc, wollastonite, silica, mica, kaolin or montmorillonite clay, silica, quartz, barite, and the like, and combinations comprising any of the foregoing reinforcing fillers. In some embodiments, the filler can be a mineral filler comprising kaolin clay, talc, or a combination comprising at least one of the foregoing. For example, the filler can be a mineral filler selected from the group consisting of kaolin clay, talc, and a combination of the foregoing. The filler can have an average particle size of 0.1 to 2 micrometers in diameter. The composition can include the filler in an amount greater than 0 to 15 wt %, or 1 to 15 weight percent, or 4 to 10 wt %, based on the total weight of the composition.

The thermoplastic composition optionally further include additives known in the art for use in wire coating applications, provided that the additives do not substantially adversely affect the desired properties of the compositions. Such additives include UV absorbers, light stabilizers, heat stabilizers, lubricants, plasticizers, pigments, dyes, colorants, anti-static agents, foaming agents, blowing agents, metal deactivators, antioxidants, nucleating agents, and combinations comprising one or more of the foregoing additives.

Antioxidants can be compounds such as phosphites, phosphonites and hindered phenols or mixtures thereof. Phosphorus containing stabilizers including triaryl phosphite and aryl phosphonates are of note as useful additives. Difunctional phosphorus containing compounds can also be employed. Stabilizers can have a molecular weight greater than or equal to 300. In some embodiments, phosphorus containing stabilizers with a molecular weight greater than or equal to 500 are useful. Flow aids and mold release compounds are also contemplated. When present, the total amount of organic additive is more than 0 to 5 wt %, based on the combined weight of the polymer components. In some embodiments, the composition contains no additives.

A color concentrate or master batch can optionally be added to the composition prior to or during extrusion coating. When a color concentrate is used it is typically present in an amount less than or equal to 3 wt %, based on the total weight of the composition. In some embodiments the master batch comprises a poly(etherimide-siloxane) copolymer.

The thermoplastic composition can also be co-extruded with an additional thermoplastic composition to form a multi-layer article. The additional thermoplastic composition can comprise polyaryletherketone, poly(arylene ether), polysulfone, polyolefin, polyamide, or a combination comprising at least one of the foregoing.

The thermoplastic composition can be prepared by melt-mixing or a combination of dry blending and melt-mixing. Melt-mixing can be performed in single or twin screw type extruders or similar mixing devices which can apply a shear and heat to the components. Melt-mixing can be performed at temperatures greater than or equal to the melting temperatures of the copolymers and less than the degradation temperatures of either of the copolymers.

All of the ingredients can be added initially to the processing system. In some embodiments, the ingredients can be added sequentially and/or through the use of one or more master batches. It can be advantageous to apply a vacuum to the melt through one or more vent ports in the extruder to remove volatile impurities in the composition. In some embodiments melt-mixing is performed using an extruder and the composition exits the extruder in a strand or multiple strands. The shape of the strand is dependent upon the shape of the die used and has no particular limitation. In some embodiments the composition is the product of melt-mixing the polymers and, when present, any additives.

In an exemplary embodiment, compounding is performed using a Toshiba TEM-37BS twin screw extruder. The compositions can be injection molded using a Nissei ES3000-25E injection molding machine following drying of the compounded pellets.

In an important embodiment, the thermoplastic compositions comprising the poly(etherimide-siloxane), the aromatic ketone, and the mineral filler can have a lower toxicity index than the same composition without the aromatic polyketone, without the mineral filler, or without both, as determined in accordance with EN53505. The thermoplastic composition including the poly(etherimide-siloxane), the aromatic ketone, and the mineral filler can have reduced ITC values of 5 to 12, compared to ITC values of 19 to 20.4 for compositions not including the aromatic ketone and the mineral filler. The thermoplastic composition including the poly(etherimide-siloxane), the aromatic ketone, and the mineral filler can have reduced HCN/benzene ratios of 0.001 to 0.023, compared to HCN/benzene ratios of 0.127 to 0.142 for compositions not including the aromatic ketone and the mineral filler.

In another important embodiment, the thermoplastic compositions comprising the poly(etherimide-siloxane) and the mineral filler can have a lower toxicity index than the same composition without the mineral filler, as determined in accordance with EN53505. For example, the poly(etherimide-siloxane) copolymer compositions including the mineral filler can have reduced HCN/benzene ratios of 0.01 to 0.122, compared to HCN/benzene ratios of 0.127 to 0.142 for compositions not including the mineral filler In still another important embodiment, the thermoplastic compositions comprising the poly(etherimide-siloxane) and the aromatic ketone can have a lower toxicity index than the same composition without the aromatic ketone, as determined in accordance with EN53505. For example, the poly(etherimide-siloxane) copolymer compositions including the aromatic ketone can have reduced ITC values of 5 to 15, compared to ITC values of 19 to 20.4 for compositions not including the aromatic ketone. The poly(etherimide-siloxane) copolymer compositions including the aromatic ketone also generally can have reduced HCN/benzene ratios of 0.001 to 0.119, or 0.001 to 0.05, compared to HCN/benzene ratios of 0.127 to 0.142 for compositions not including the aromatic ketone.

The thermoplastic compositions can have a desirable combination of properties, such properties being determined in the absence of the conductor wire. For example it is desirable for the thermoplastic composition to have a melt flow rate (MFR) of 5 to 150 grams per 10 minutes (g/10 min), or 7 to 125 g/10 min, or 9 to 110 g/10 min, or 10 to 100 g/10 min, measured at 367° C. and a load of 6.7 kilograms according to ASTM D1238.

The thermoplastic composition can have a flexural modulus of 150 to 3000 megaPascals (MPa), or 350 to 2000 MPa as determined by ASTM D790 at 3.2 millimeters.

The thermoplastic composition can have a tensile modulus of greater than 600 MPa, for example 620 to 3500 MPa, as determined according to ASTM D638. Within this range, in some embodiments the composition can have a tensile modulus of greater than 2500 MPa, for example 2600 to 3500 MPa, determined according to ASTM D638.

The thermoplastic composition can have a tensile elongation at break of greater than or equal to 10% as determined by ASTM D638. The elongation at break can be less than or equal to 500%. Specifically, the tensile elongation at break can be greater than 10% and less than or equal to 300%.

The thermoplastic composition can have tensile stress at break of greater than or equal to 20 MPa, for example 21 to 85 MPa, as determined by ASTM D638.

The thermoplastic composition can have a Shore D hardness of greater than 75, for example 76 to 88, determined according to ASTM D1238.

The thermoplastic composition can have a tear strength of greater than 25 N/mm, for example 30 to 80 N/mm, determined according to ISO 34-1.

The thermoplastic compositions can be extruded or molded to form an article such as a construction component, a building component, an electrical device component, a railway vehicle component, an automobile component, a bus component, a marine vehicle component, or an aircraft component. In some embodiment, the component is a tube or a coated wire.

A coated wire comprises a conductor and a covering disposed over the conductor wire. The covering comprises the previously described thermoplastic composition. The composition is applied to the conductor wire by a suitable method such as extrusion coating to form a coated wire. For example, a coating extruder equipped with a screw, crosshead, breaker plate, distributor, nipple, and die can be used. The melted thermoplastic composition forms a covering disposed over a circumference of the conductor wire. Extrusion coating can employ a single taper die, a double taper die, other appropriate die or combination of dies to position the conductor centrally and avoid die lip build-up.

In some embodiments it can be useful to dry the thermoplastic composition before extrusion coating. Exemplary drying conditions are 60 to 110° C. for 2 to 20 hours.

In some embodiments, during extrusion coating, the thermoplastic composition is melt filtered, prior to formation of the coating, through one or more filters. In some embodiments the thermoplastic composition has substantially no particulates greater than 80 micrometers in size. In some embodiments any particulates present will be less than or equal to 40 micrometers in size. In some embodiments there will be substantially no particulates greater than 20 micrometers in size. The presence and size of particulates can be determined using a solution of 1 gram of thermoplastic composition dissolved in 10 milliliters of a solvent, such as chloroform, and analyzing it using microscopy or light scattering techniques. Substantially no particulates is defined as having less than or equal to 3 particulates, or, more specifically, less than or equal to 2 particulates, or, even more specifically, less than or equal to 1 particulate per one gram sample. Low levels of particulates are beneficial for giving a layer of insulation on a coated wire that will not have electrically conductive defects as well as providing coatings with improved mechanical properties.

The extruder temperature during extrusion coating is generally less than the degradation temperature of the polyaryletherketone and poly(etherimide-siloxane) copolymer. Additionally the processing temperature can be adjusted to provide a sufficiently fluid molten composition to afford a covering for the conductor wire, for example, higher than the softening point of the thermoplastic composition, or more specifically at least 20° C. higher than the melting point of the thermoplastic composition.

After extrusion coating the conductive wire is usually cooled using a water bath, water spray, air jets or a combination comprising one or more of the foregoing cooling methods. Exemplary water bath temperatures are 20 to 90° C., specifically 80 to 90° C.

In some embodiment, the composition is applied to the conductor wire to form a covering disposed over and in physical contact with the conductor wire. Additional layers can be applied to the covering. Any methods of coating a conductor wire that are generally known can be used. In some embodiments, the composition is applied to a conductor wire having one or more intervening layers between the conductor wire and the covering to form a covering disposed over the conductor wire. For instance, an optional adhesion promoting layer can be disposed between the conductor wire and covering. In another example the conductor wire can be coated with a metal deactivator prior to applying the covering. Alternatively, a metal deactivator can be mixed with the thermoplastic composition. In another example the intervening layer comprises a thermoplastic or thermoset composition that, in some cases, is foamed.

The conductor wire can comprise a single strand or a plurality of strands. In some cases, a plurality of strands can be bundled, twisted, braided, or a combination of the foregoing to form a conductor wire. Additionally, the conductor wire can have various shapes such as round or oblong. Suitable materials for the conductor wires include, but are not limited to, copper, aluminum, lead, gold, silver, iron, nickel, chromium, and alloys comprising at least one of the foregoing metals. In an exemplary embodiment, the conductor wire is copper. The conductor wire can also be coated with, e.g., tin, gold or silver. In some embodiments the conductor wire comprises optical fibers.

The cross-sectional area of the conductor and thickness of the covering can vary and is typically determined by the desired application for the coated wire. The coated wire can be used as coated wire without limitation, including, for example, for harness wire for automobiles, wire for household electrical appliances, wire for electric power, wire for instruments, wire for information communication, wire for electric cars, as well as ships, airplanes, and the like. Specific applications that can benefit from coated electrical wires comprising the thermoplastic composition are those requiring high-heat, thin-walled wire coatings, for example for high-heat train, automobile, and aircraft applications. In some specific embodiments, an article can comprise the electrical wire having a covering comprising the thermoplastic composition, wherein the article is a railway vehicle component, an automobile component, or an aircraft component In some embodiments the covering can have a thickness of 0.01 to 10 millimeters (mm), specifically, 0.05 to 5 mm, more specifically, 0.1 to 1 mm.

Multiple coated wires can be combined to form a cable. The cable can comprise additional protective elements, structural elements, or a combination thereof. An exemplary protective element is a jacket which surrounds the group of coated wires. The jacket and the covering on the coated wires, singly or in combination, can comprise the thermoplastic composition described herein. A structural element is a typically non-conductive portion which provides additional stiffness, strength, shape retention capability or the like.

The poly(etherimide-siloxane) thermoplastic compositions provided are cost-effective, and demonstrate improved physical properties, including low flammability, low toxicity, high temperature stability, in combination with one or more of low flexural modulus, high tensile elongation, and in some embodiments high tear strength. Therefore, a substantial improvement in thermoplastic compositions for use as electrical wire coatings is provided.

The thermoplastic compositions coating the conductor wires can have the above-described properties, in particular low toxicity. Additionally, they can have one or more of a tensile elongation greater than 100% and a tensile stress at break greater than 30 MPa, as extruded, as measured according to ASTM D638; a tensile elongation greater than 50% and a tensile stress at break greater than 30 MPa after heat aging at 178° C. for 168 hours, as measured according to ASTM D638; a tear strength greater than 30 N/mm, measured using a tear speed of 100 mm/min; or an ITC toxicity value of less than 15, or less than 10 as measured according to EN50305.

A color concentrate or master batch can be added to the composition prior to or during extrusion coating. When a color concentrate is used it is typically present in an amount less than or equal to 3 wt %, based on the total weight of the composition. In some embodiments the master batch comprises the poly(etherimide-siloxane) copolymer.

The thermoplastic composition can be coextruded with an additional thermoplastic composition to form a multi-layer article. The additional thermoplastic composition can comprise polyaryletherketone, poly(arylene ether), polysulfone, polyolefin, polyamide, or a combination comprising at least one of the foregoing.

The thermoplastic composition can be injection molded and/or thermoformed to form an article as well. Advantageously, the present composition now provides for a previously unmet need for a composition that has a ductility that is better than aromatic polyketones such as polyaryletherketones, that retains the advantageous processing features found in aromatic polyketones, and displays a lower toxicity. Users can now make a variety of articles that exhibit performance properties that are valued by their respective customers, for example in subway, aircraft, and passenger vehicle applications.

Further information is provided by the following non-limiting examples.

EXAMPLES

The materials used in the following examples are described in Table 1.

TABLE 1

| Material | Chemical Description | Source |
| --- | --- | --- |
| PEEK-1 | A polyetheretherketone commercially available under the trade name CoPEEK 085G. | PANJIN ZhongRun High Performance Polymer Co., Ltd |
| PEEK-2 | A polyetheretherketone commercially available under the trade name PEEK 150 G. | VICTREX |
| STM1700 | A poly(etherimide-siloxane) extended block copolymer having a siloxane content of 20 weight percent, based on the total weight of the block copolymer, available as SILTEM ™. | SABIC |
| STM1500 | A poly(etherimide-siloxane) extended block copolymer having a siloxane content of 40 weight percent, based on the total weight of the block copolymer, available as SILTEM ™. | SABIC |
| Kaolin-1 | Fine Kaolin clay (hydrated aluminum silicate) having a particle size of 0.4 micrometers in diameter available as KaMin HG90. | KaMin, LLC |
| Kaolin-2 | Fine Kaolin clay (hydrated aluminum silicate) having a particle size of 1.1 micrometer in diameter, available as KaMin 611. | KaMin, LLC |

TABLE 1-continued

| Material | Chemical Description | Source |
|---|---|---|
| Kaolin-3 | Surface-treated Kaolin clay available as Polyfil WC. | KaMin, LLC |
| Talc | Fine talc having a particle size of 1.0-1.1 micrometer in diameter, available as Jetfine 3CA. | Rio Tinto Minerals |
| Silica | Micro-sized fumed silica available as silicon dioxide YJ958. | Shanghai Yuejiang Titanium Chem. Manuf. |
| MgO | Magnesium oxide available as KyowaMag 150. | Mitsui Shanghai |
| ZnO | Zinc oxide available as Zinkoxid-Aktiv. | Bayer |

The compositions of the following Examples were prepared by melt-mixing using a two lobe 24 millimeter (mm) co-rotating intermeshing twin screw extruder having a barrel temperatures of 300 to 370° C. Unless otherwise specified, the components were added at the feed throat of the extruder. The material was run at 28-32 kilograms per hour (kg/hr) using 400 rotations per minute (rpm) screw speed.

Test parts were injection molded at 340 to 370° C. using a 30 second cycle time from compositions dried for at least 4 hours at 150 to 170° C. All molded samples were conditioned for at least 48 hours at 23° C. and 50% relative humidity prior to testing.

Coated wire samples were also prepared, where the coating comprises the thermoplastic composition described above. The samples were prepared using a WTL EXL50 extrusion coating machine. The wire used was American Wire Gauge (AWG) 18 copper conductor wire. The composition, in pelleted form, was dried at 105° C. for 8 hours prior to extrusion. The wire was pre-heated at 120 to 140° C. and subsequently extrusion coated with the thermoplastic composition at a temperature of 360° C., followed by hot water cooling at a temperature of 80 to 90° C. The line speed was 50 to 100 m/min. The wire coating thickness was 0.1 to 1 mm, specifically 0.25 mm.

The samples were tested for melt flow rate (MFR) according to ASTM D1238; results are in g/10 min.

Notched Izod was determined according to ASTM D256 at 23° C. on 3.2 millimeter thick bars; results are reported in Joules per meter (J/m).

Tensile modulus, tensile strength, and elongation to break were determined according to ASTM D 638 on 3.2 millimeter thick type I bars.

Tensile strength is reported at yield. Flexural modulus and flexural strength were determined according to ASTM method D790 and results are reported in MPa.

GC-MS testing for detection of HCN was performed by pyrolysis of 0.2 mg samples at 800° C. for 15 seconds using a CDS 5000 pyrolyzer. Pyrolysates were analyzed using a Shimadzu GC-MS. The peak height of selected ions of HCN and benzene in the mass spectra were used to calculate the ratio of HCN/benzene. The GC-MS method was found to give similar toxicity results for the compositions compared to the results obtained by conventional ITC testing according to EN50305, discussed below (shown in FIG. 1).

The wire samples were tested for wire tensile stress and elongation to break according to UL1581; results are reported in MPa and %, respectively. Testing was done both before and after heat aging at 178° C. for 168 hours. Heat aging was conducted in an oven. The tensile measurements on wire samples were done using Instron 3365, which is an electro-mechanical Universal Testing Machine (UTM). Test samples of 80 to 100 mm in length were slit open from wire samples using a fresh razor blade. As the insulation is hard, they could not be stripped using conventional wire stripper. The end of the sample was wrapped with aluminum foil, to avoid jaw crush. The sample was then gripped using the pneumatic grip with 30 psi pressure. The extensometer was attached to the sample, the tension in the extensometer is adjusted to ensure no slippage of the extensometer and no breakage of the sample happens during gripping and testing.

VW1 and VDE flame tests were conducted on single wires, according to UL1581 and EN50265-2-1/IEC60332-1, respectively. Conventional toxicity index (ITC) was measured per the DIN standard, EN50305. As per the protocol, the test was carried out to measure concentration of gases evolved when 1 gram of sample is burned in a volume of 1 cubic meter (m$^3$). The concentrations of evolved gases (CO, $CO_2$, $SO_2$, HCN and $NO_x$) were measured. The toxicity index is measured by the formula $$ITC = 100 \times \Sigma(t_i/C_{ci})$$

wherein $t_i$ are measured concentrations and $C_{ci}$ are critical concentrations as mentioned by the standards. The ITC value, as such, is unit-less, but is a % of ratio of concentrations.

Physical testing of the compositions and the coated wires was conducted according to the standards summarized in Table 2. Unless indicated otherwise, all tests are the test in effect in the year 2010.

TABLE 2

| | Test Standard | Specimen Type | Units |
|---|---|---|---|
| Flexural Test | ASTM D790 | Bar - 127 × 12.7 × 3.2 mm | MPa |
| Filled Tensile Test | ASTM D638 | ASTM Type I Tensile bar | MPa, % |
| Notched Izod Impact (NII) | ASTM D256 | 3.2 millimeter thick bars | J/m |
| Shore D Hardness | ASTM D 2240 | Overlap 2 Color chips 80 × 50 × 3.2 mm | |
| Tear strength | ISO 34-1 | Bar - 127 × 12.7 × 1.6 mm | N/mm |
| Melt Flow Rate (MFR) | ASTM D1238 | Pellets | g/10 min |
| Wire Tensile Test | UL1581 | Single wire | MPa, % |
| Wire VW-1, 1 C | UL1581 | Single wire | |
| Wire VDE | EN50265-2-1/IEC60332-1 | Single wire | |
| 94Vx | UL94 | Flame bar - 127 × 12.7 × 1.6 or 1.0 mm | |
| Toxicity (ITC value) | EN50305 | Pellet/Wire | |

For each of the Examples, the polymer components and any additives were melt-mixed in the amounts shown in the Tables, extruded, and the compositions were characterized as described above.

The physical properties of coated wires were characterized following extrusion of the compositions to form a covering disposed on the surface of a copper conductor wire.

Examples 1-12

Compositions and results for Examples 1-12 are shown in Table 3.

TABLE 3

| | Units | 1* | 2* | 3 | 4 | 5 | 6 | 7 |
|---|---|---|---|---|---|---|---|---|
| Components | | | | | | | | |
| PEEK-1 | wt % | | | | | | | |
| STM1700 | wt % | | 100 | | | | | |
| STM1500 | wt % | 100 | | 95 | 90 | 95 | 90 | 95 |
| Kaolin-1 | wt % | | | 5 | 10 | | | |
| Kaolin-2 | wt % | | | | | 5 | 10 | |
| Talc | wt % | | | | | | | 5 |
| Properties | | | | | | | | |
| Flexural Modulus | MPa | 327 | 2150 | 483 | 524 | 498 | 543 | 516 |
| Flexural Stress | MPa | 10.4 | 94 | 17.3 | 17.7 | 17.4 | 18.1 | 17.7 |
| Shore D Hardness | | 58.7 | 88.4 | | | | | |
| Tensile Modulus | MPa | 419.6 | 2410 | 620.6 | 662.2 | 636.2 | 670.6 | 637.2 |
| Tensile Stress | MPa | 19.5 | 53 | 23 | 22.8 | 22.8 | 22.9 | 23.5 |
| Tensile Elong. | % | 51.97 | 20 | 54.22 | 43.4 | 57.74 | 44.96 | 82.22 |
| NII | J/m | 520 | 110 | 291 | 260 | 284 | 242 | 412 |
| HDT | °C. | 55 | 145 | 42.7 | 42.7 | 42.6 | 42.8 | 42.8 |
| Specific Gravity | | 1.18 | 1.2 | 1.20 | 1.22 | 1.20 | 1.22 | 1.19 |
| UL 94 Vx, 1.0 mm | | V0 | V0 | V0 | V0 | V0 | V0 | V0 |
| UL 94 Vx, 1.6 mm | | V0 | V0 | V0 | V0 | V0 | V0 | V0 |
| MFR[1] | g/10 min | 12 | 7 | 16 | 15.7 | 15.8 | 15.3 | 16.1 |
| MFR[2] | g/10 min | | 62.5 | | | | | |
| MFR[3] | g/10 min | | | | | | | |
| Tear Strength | N/mm | 14.01 | 16.1 | | | | | |
| HCN/Benzene | | 0.127 | 0.142 | 0.105 | 0.09 | 0.12 | 0.095 | 0.117 |
| Wire tensile stress[4] | MPa | 24.22 | 51.33 | | | | | |
| Wire tensile elong.[4] | % | 117.6 | 85 | | | | | |
| Wire tensile stress[5] | MPa | 24.88 | 53.28 | | | | | |
| Wire tensile elong.[5] | % | 107.9 | 59.8 | | | | | |
| Wire tensile stress[6] | MPa | 25 | 55.32 | | | | | |
| Wire tensile elong.[6] | % | 84.73 | 44.6 | | | | | |
| Wire VW1 FR | | Pass | Pass | | | | | |
| Wire VDE FR | | Pass | Pass | | | | | |
| Wire tear strength | N/mm | 22.1 | 26 | | | | | |
| ITC | | 20.4 | 19 | | | | | |

| | Units | 8 | 9 | 10 | 11 | 12 |
|---|---|---|---|---|---|---|
| Components | | | | | | |
| PEEK-1 | wt % | | 25 | 50 | 60 | 75 |
| STM1700 | wt % | | 75 | 50 | 40 | 25 |
| STM1500 | wt % | 90 | | | | |
| Kaolin-1 | wt % | | | | | |
| Kaolin-2 | wt % | | | | | |
| Talc | wt % | 10 | | | | |
| Properties | | | | | | |
| Flexural Modulus | MPa | 614 | 2060 | 2190 | 2320 | 2810 |
| Flexural Stress | MPa | 19.4 | 106 | 99.7 | 105 | 118 |
| Shore D Hardness | | | | 84.2 | 85 | |
| Tensile Modulus | MPa | 738.6 | 2320 | 2546.2 | 2672.4 | 3160 |
| Tensile Stress | MPa | 22.4 | 65.5 | 83.7 | 81.4 | 81.2 |
| Tensile Elong. | % | 65.22 | 111 | 158.1 | 123.3 | 147 |
| NII | J/m | 392 | 347 | 537 | 290 | 160 |
| HDT | °C. | 43.3 | 144.3 | 137 | 141 | 140.7 |
| Specific Gravity | | 1.22 | 1.24 | 1.25 | 1.26 | 1.27 |
| UL 94 Vx, 1.0 mm | | | V0 | V0 | V0 | V0 |
| UL 94 Vx, 1.6 mm | | | V0 | V0 | V0 | V0 |
| MFR[1] | g/10 min | 14.4 | | | | |
| MFR[2] | g/10 min | | 45.2 | | | |
| MFR[3] | g/10 min | | | 79.4 | 85.3 | 121 |

TABLE 3-continued

| | | | | | | |
|---|---|---|---|---|---|---|
| Tear Strength | N/mm | | 28.6 | 44.11 | 51.36 | 41.7 |
| HCN/Benzene | | 0.113 | 0.041 | 0.024 | 0.022 | 0.007 |
| Wire tensile stress[4] | MPa | | 55.6 | 71.61 | 75.43 | 79.6 |
| Wire tensile elong.[4] | % | | 128.6 | 154.15 | 140.84 | 143.7 |
| Wire tensile stress[5] | MPa | | 57.1 | 74.32 | 77.3 | 79.9 |
| Wire tensile elong.[5] | % | | 122.2 | 147.3 | 134.1 | 139.4 |
| Wire tensile stress[6] | MPa | | 56.6 | 77.08 | 79.03 | 81.3 |
| Wire tensile elong.[6] | % | | 111 | 130.1 | 122.47 | 121.1 |
| Wire VW1 FR | | | Pass | Pass | Pass | Pass |
| Wire VDE FR | | | Pass | Pass | Pass | Pass |
| Wire tear strength | N/mm | | 35.6 | 62.1 | 64.3 | 59.8 |
| ITC | | | 12.7 | 12.2 | 9.45 | 7 |

*Denotes Comparative Example
[1] 295° C., 6.7 kg, 300 s;
[2] 337° C., 6.7 kg, 300 s;
[3] 367° C., 6.7 kg, 300 s;
[4] 23° C., 24 hours;
[5] 158° C., 168 hours;
[6] 178° C., 168 hours As Comparative Examples, compositions comprising only poly(etherimide-siloxane) copolymers were tested (Comparative Examples 1* and 2*). The poly(etherimide-siloxane) copolymers showed good wire tensile elongation of 85% or greater, with 70 to 92% retention after heat aging at 158° C. for 168 hours, and 50 to 75% retention after heat aging at 178° C. for 168 hours. The poly(etherimide-siloxane) copolymers showed poor wire tear strength at 22.1 and 26 N/mm for Comparative Examples 1* and 2*, respectively, and further showed relatively high ITC toxicity values (20.4 and 19). The coated wire samples also passed both VW-1 and VDE flame tests, indicative of the excellent flame retardant properties of Siltem.

Additional Examples comprising poly(etherimide-siloxane) copolymers and a mineral filler were tested (Examples 3-8). The mineral filler is kaolin clay (Examples 3-6) or talc (Examples 7-8) having an average particle size of 0.4 to 1.1 micrometers. The poly(etherimide-siloxane) copolymer compositions including the mineral filler generally showed reduced toxicities, with HCN/benzene ratios of 0.09 to 0.117, compared to HCN/benzene ratios of 0.127 to 0.142 for compositions not including the mineral filler.

Additional Examples comprising poly(etherimide-siloxane) copolymers and an aromatic polyketone were tested (Comparative Examples 9-12). Compositions including a poly(etherimide-siloxane) copolymer and an aromatic polyketone show improved physical properties, particularly including wire tensile elongation of greater than 100% even after heat aging at 158° C. and 178° for 160 hours. The wire tensile stress was also improved compared to compositions not including the aromatic polyketone. The wire tear strength was also improved compared to the compositions including only the poly(etherimide-siloxane) copolymer. The wire tear strength was 35.6 to 64.3 N/mm when the aromatic polyketone was included, compared to 22.1 to 26 for the poly(etherimide-siloxane) copolymer-only coated wires. The ITC of the compositions was improved having values of 7-12.7, compared to the poly(etherimide-siloxane)-only compositions of Comparative Example 1* and 2*, having values of 19-20.4.

Examples 13-21

Compositions and results for Examples 13-21 are shown in Table 4.

TABLE 4

| | Units | 13 | 14 | 15 | 16 | 17 | 18 | 19 | 20 | 21 |
|---|---|---|---|---|---|---|---|---|---|---|
| Components | | | | | | | | | | |
| PEEK-1 | wt % | 57.6 | 56.4 | 55.2 | 54 | 56.4 | 56.4 | 56.4 | 23.5 | 47 |
| PEEK-2 | wt % | | | | | | | | | |
| STM1700 | wt % | 38.4 | 37.6 | 36.8 | 36 | 37.6 | 37.6 | 37.6 | 70.5 | 47 |
| Kaolin-1 | wt % | 4 | 6 | 8 | 10 | | | | 6 | 6 |
| Kaolin-2 | wt % | | | | | 6 | | | | |
| Kaolin-3 | wt % | | | | | | | 6 | | |
| Talc | wt % | | | | | | 6 | | | |
| Properties | | | | | | | | | | |
| Flexural Modulus | MPa | 2430 | 2510 | 2600 | 2710 | 2580 | 2870 | 2740 | 2210 | 2380 |
| Flexural Stress | MPa | 102 | 104 | 104 | 104 | 105 | 110 | 117 | 105 | 107 |
| Shore D Hardness | | 82.1 | 82.4 | 83 | 83.1 | 82.6 | 82.5 | | | |
| Tensile Modulus | MPa | 2579.6 | 2652 | 2714.4 | 2822.6 | 2722.6 | 3094.4 | 3002.8 | 2543.6 | 2680.2 |
| Tensile Stress | MPa | 34.9 | 37.8 | 37.6 | 38.5 | 35.3 | 37 | 58.4 | 32.8 | 36.1 |
| Tensile Elongation | % | 92.1 | 97.02 | 80.6 | 91.94 | 49.52 | 31.76 | 78.62 | 108.2 | 120.8 |
| NII | J/m | 1330 | 1240 | 1070 | 1330 | 1180 | 139 | 84 | 1090 | 1060 |
| HDT | ° C. | 138 | 139 | 139 | 138 | 139 | 140 | 143 | 140 | 138 |
| Specific Gravity | | 1.27 | 1.28 | 1.30 | 1.31 | 1.28 | 1.29 | 1.29 | 1.26 | 1.27 |
| UL 94 Vx, 1.0 mm | | V0 | V0 | V0 | V0 | V0 | V0 | V0 | V0 | V0 |
| UL 94 Vx, 1.6 mm | | V0 | V0 | V0 | V0 | V0 | V0 | V0 | V0 | V0 |
| MFR[1] | g/10 min | | | | | | | | | |

TABLE 4-continued

| | Units | 13 | 14 | 15 | 16 | 17 | 18 | 19 | 20 | 21 |
|---|---|---|---|---|---|---|---|---|---|---|
| MFR$^2$ | g/10 min | | | | | | | | 40.6 | |
| MFR$^3$ | g/10 min | 79.3 | 76.7 | 72.1 | 63.2 | 65.7 | 106 | 42 | | 77 |
| Tear Strength | N/mm | 53.28 | 46.97 | 40.82 | 49.16 | 45.47 | 67.12 | 42.1 | 25.4 | 41.8 |
| HCN/Benzene | | 0.011 | 0.009 | 0.005 | 0.006 | 0.008 | 0.009 | 0.014 | 0.021 | 0.014 |
| Wire tensile stress$^4$ | MPa | 84.23 | 86.03 | 76.1 | 69.37 | 89.53 | 78.94 | 88.5 | 50.4 | 70.3 |
| Wire tensile elong.$^4$ | % | 139.86 | 136.15 | 130.2 | 137.1 | 150.18 | 135.22 | 139.4 | 120.7 | 147.6 |
| Wire tensile stress$^5$ | MPa | 85.02 | 89.97 | 72.5 | 69.19 | 82.98 | 80.32 | 86.1 | 52 | 77.4 |
| Wire tensile elong.$^5$ | % | 150.55 | 149.35 | 103.6 | 63.01 | 143.6 | 161.3 | 132.7 | 116.4 | 143.9 |
| Wire tensile stress$^6$ | MPa | 94.29 | 100.66 | 88.51 | 82.98 | 98.33 | 96.15 | 90.1 | 52.2 | 74.3 |
| Wire tensile elong.$^6$ | % | 142.65 | 157.5 | 84.8 | 34.53 | 149.8 | 137.98 | 122.9 | 101.3 | 140.3 |
| Wire VW1 FR | | Pass | Pass | Pass | Pass | Pass | Pass | Pass | Pass | Pass |
| Wire VDE FR | | Pass | Pass | Pass | Pass | Pass | Pass | Pass | Pass | Pass |
| Wire tear strength | N/mm | 66.78 | 65.03 | 58.73 | 55.85 | 68.67 | 65.58 | 56.3 | 32.1 | 55.7 |
| ITC | | 7.9 | 7.1 | 6.5 | 6.6 | 7.5 | 8.2 | 8.9 | 9.4 | 8.6 |

*Denotes Comparative Example;
$^1$295° C., 6.7 kg, 300 s;
$^2$337° C., 6.7 kg, 300 s;
$^3$367° C., 6.7 kg, 300 s;
$^4$23° C., 24 hours;
$^5$158° C., 168 hours;
$^6$178° C., 168 hours Examples 13-21 are compositions comprising poly(etherimide-siloxane) block copolymer blended with an aromatic polyketone, specifically, polyetheretherketone (PEEK), and a mineral filler, where the mineral filler is kaolin clay (13-17, 19-21) or talc (18) having a particle size of 0.4 to 1.1 micrometers. The addition of the aromatic ketone and the specific mineral fillers in the blend resulted in wire tensile elongations of greater than 100% for Examples 13-14 and 17-21 before and after heat aging and wire tensile stress of greater than 50 MPa before and after heat aging. The wire samples were able to pass both a VW1 and VDE flame test. The wire tear strength was 32.1 to 68.67 N/mm, depending on the composition, showing an improvement over the poly(etherimide-siloxane) block copolymer-only compositions, and the ITC toxicity values were further improved by the addition of the specific mineral fillers. The lowest ITC values were obtained for compositions including 8-10 weight percent of kaolin clay having an average particle size of 0.4 m.

Figure 2:
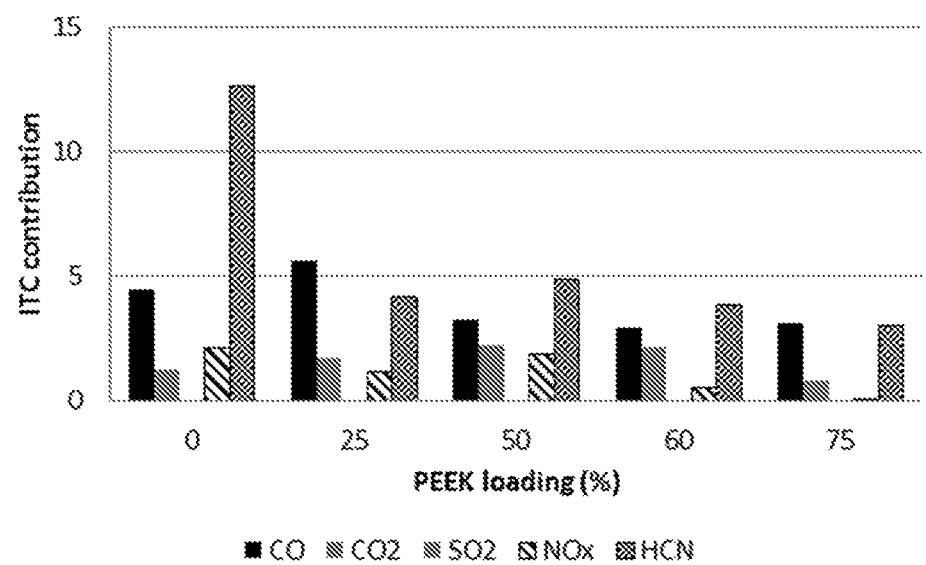
FIG. 2 shows ITC toxicity contribution of various gases for poly(etherimide-siloxane) compositions having varying aromatic polyketone loading. It is noted that HCN accounts for the greatest portion of the ITC toxicity value compared to the other gases shown.

The HCN/benzene ratio for examples 13-21 determined using the above-described GC-MS method, were also significantly lower (HCN/benzene ratio of 0.005 to 0.21) compared to the HCN/benzene ratio for compositions according to the comparative examples not including a mineral filler (HCN/benzene ratio of 0.016-0.142). Therefore, the concentration of HCN released for each of examples 13-21 was surprisingly reduced. This represents an advantageous feature of the present invention, as HCN is generally one of the most toxic gases released during combustion, and represents a greater percentage of the total released gases from the compositions, as shown in FIG. 2.

Comparative Examples 22-28

Compositions and results for Comparative Examples 22-28 are shown in Table 5.

TABLE 5

| | Units | 22* | 23* | 24* | 25* | 26* | 27* | 28* |
|---|---|---|---|---|---|---|---|---|
| Components | | | | | | | | |
| PEEK-1 | wt % | 58.2 | 56.4 | 56.4 | 54 | 54 | 100 | |
| PEEK-2 | wt % | | | | | | | 100 |
| STM1700 | wt % | 38.8 | 37.6 | 37.6 | 36 | 36 | | |
| Silica | wt % | 3 | 6 | | | 10 | | |
| MgO | wt % | | | 6 | | | | |
| ZnO | wt % | | | | 10 | | | |
| Properties | | | | | | | | |
| Flexural Modulus | MPa | 2370 | 2510 | 2520 | 2510 | 2620 | 3010 | 3000 |
| Flexural Stress | MPa | 106 | 109 | 104 | 107 | 107 | 134 | 138 |
| Shore D Hardness | | | | | | | | |
| Tensile Modulus | MPa | 2720 | 2815.6 | 2678.4 | 2685.2 | 2800.2 | 3417.4 | 3424 |
| Tensile Stress | MPa | 47.2 | 59.2 | 46.8 | 56.8 | 58.5 | 58.7 | 58.5 |
| Tensile Elong. | % | 25.2 | 9.75 | 64.68 | 18.56 | 8.63 | 27.1 | 34.5 |
| NII | J/m | 99.5 | 71.7 | 97.2 | 97.5 | 94.2 | 48.3 | 49.7 |
| HDT | ° C. | 135 | 139 | 134 | 141 | 137 | 143 | 148 |
| Specific Gravity | | 1.27 | 1.28 | 1.29 | 1.34 | 1.29 | 1.29 | 1.29 |
| UL 94 Vx, 1.0 mm | | V0 | V0 | V0 | V0 | V0 | V0 | V0 |
| UL 94 Vx, 1.6 mm | | V0 | V0 | V0 | V0 | V0 | V0 | V0 |
| MFR$^1$ | g/10 min | | | | | | | |
| MFR$^2$ | g/10 min | | | | | | | |
| MFR$^3$ | g/10 min | 102 | 110 | 104 | 96.6 | 57.7 | | |

TABLE 5-continued

|  | Units | 22* | 23* | 24* | 25* | 26* | 27* | 28* |
|---|---|---|---|---|---|---|---|---|
| Tear Strength | N/mm |  |  |  |  |  | 55 | 54 |
| HCN/Benzene |  | 0.017 | 0.022 | 0.027 | 0.017 | 0.016 | 0 | 0 |
| Wire tensile stresss[4] | MPa |  |  |  |  |  |  |  |
| Wire tensile elong.[4] | % |  |  |  |  |  |  |  |
| Wire tensile stress[5] | MPa |  |  |  |  |  |  |  |
| Wire tensile elong.[5] | % |  |  |  |  |  |  |  |
| Wire tensile stress[6] | MPa |  |  |  |  |  |  |  |
| Wire tensile elong.[6] | % |  |  |  |  |  |  |  |
| Wire VW1 FR |  |  |  |  |  |  | Pass | Pass |
| Wire VDE FR |  |  |  |  |  |  | Pass | Pass |
| Wire tear strength | N/mm |  |  |  |  |  | 64 | 65 |
| ITC |  |  |  |  |  |  | 2.3 | 1.9 |

*Denotes Comparative Example
[1]295° C., 6.7 kg, 300 s;
[2]337° C., 6.7 kg, 300 s;
[3]367° C., 6.7 kg, 300 s;
[4]23° C., 24 hours;
[5]158° C., 168 hours;
[6]178° C., 168 hours Comparative Examples 22*-26* are compositions comprising poly(etherimide-siloxane) block copolymer blended with an aromatic polyketone (PEEK), and a mineral filler, specifically, silica (22-23, 26), magnesium oxide (24), or zinc oxide (25). The tensile elongation of these compositions was observed to be significantly reduced. The detected HCN levels were also observed to be higher. These results indicate the importance of the identity of the mineral filler to maintain excellent physical properties and further achieve low toxicity electrical wire coatings.

Comparative Examples 27* and 28* are compositions including only the aromatic polyketone, specifically, PEEK. These compositions were observed to have a very low toxicity and high wire tear strength. However, the poor tensile elongation noted for these compositions demonstrates the drawbacks of associated with the use of aromatic polyketones in wire coating applications.

The thermoplastic compositions, electrical wires, and articles made therefrom are further illustrated by the following embodiments, which are non-limiting.

Embodiment 1

A thermoplastic composition comprising, based on the total weight of the composition, 25 to less than 95 weight percent poly(etherimide-siloxane) copolymer having a siloxane content of more than 0 to less than 50 weight percent based on the total weight of the poly(etherimide-siloxane) copolymer; 5-75 weight percent of an aromatic polyketone; and greater than 0 to 15 weight percent of a mineral filler comprising kaolin clay, talc, or a combination comprising at least one of the foregoing, and preferably having a particle diameter of 0.1 to 2 micrometers; wherein the thermoplastic composition has a lower toxicity index than the same thermoplastic composition not including the aromatic ketone, the mineral filler, or both, as determined in accordance with EN 53505, or a lower HCN/benzene ratio than the same thermoplastic composition not including the aromatic polyketone, the mineral filler, or both.

Embodiment 2

A thermoplastic composition comprising, based on the total weight of the composition, 25 to less than 100 weight percent, preferably 85 to 95 weight percent of a poly(etherimide-siloxane) copolymer having a siloxane content of more than 0 to less than 50 weight percent based on the total weight of the poly(etherimide-siloxane) copolymer; and greater than 0 to 15 weight percent, preferably 5 to 15 weight percent of a mineral filler comprising kaolin clay, talc, or a combination comprising at least one of the foregoing; wherein the thermoplastic composition has a lower toxicity index than the same thermoplastic composition not including the aromatic ketone, the mineral filler, or both, as determined in accordance with EN 53505, or a lower HCN/benzene ratio than the same thermoplastic composition not including the aromatic polyketone, the mineral filler, or both; preferably wherein the thermoplastic composition has a lower HCN/benzene ratio than the same thermoplastic composition not including the mineral filler.

Embodiment 3

The thermoplastic composition of embodiment 2, wherein the mineral filler has a particle diameter of 0.1 to 2 micrometers.

Embodiment 4

A thermoplastic composition comprising, based on the total weight of the composition, 15 to 95 weight percent poly(etherimide-siloxane) copolymer having a siloxane content of more than 0 to less than 50 weight percent based on the total weight of the poly(etherimide-siloxane) copolymer; and 5-85 weight percent of an aromatic polyketone; wherein the thermoplastic composition has a lower toxicity index than the same thermoplastic composition not including the aromatic ketone, the mineral filler, or both, as determined in accordance with EN 53505, or a lower HCN/benzene ratio than the same thermoplastic composition not including the aromatic polyketone, the mineral filler, or both.

Embodiment 5

The thermoplastic composition of any one or more of embodiments 1 to 4, wherein the thermoplastic composition has one or more of the following properties: a flexural modulus of 150 to 3000 MPa, determined according to ASTM D790; a flexural strength of greater than 50 MPa, determined according to ASTM D790; a Shore D hardness of greater than 75, determined according to ASTM D1238; a tensile modulus of greater than 2500 MPa, determined according to ASTM D638; a tensile strength of greater than 20 MPa, determined according to ASTM D638; a tensile elongation of greater than 10%, determined according to ASTM D638 at 23° C.; a melt flow rate of 5 to 150 g/10 minutes, determined according to ASTM D1238; or a tear strength of greater than 20 N/mm, determined according to ISO 34-1.

Embodiment 6

The thermoplastic composition of any one or more of embodiments 1 to 5, wherein the poly(etherimide-siloxane) copolymer is a block copolymer having a siloxane content of 5 to 50 weight percent, based on the total weight of the block copolymer, and comprises repeating units of the formula

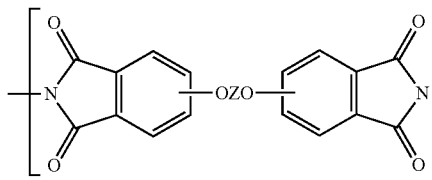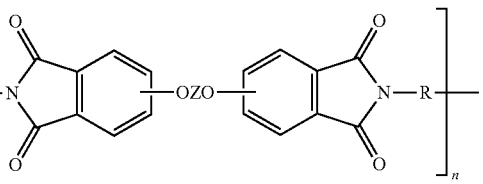

wherein Z is a residue of bisphenol A, $R^4$ is n-propylene, E is 2 to 50, n is 5 to 100, and each R' is methyl.

Embodiment 7

The thermoplastic composition of any one or more of embodiments 1 or 4 to 6, wherein the aromatic polyketone comprises polyetherketone, polyetheretherketone, polyetherketoneketone, polyaryletherketone, or a combination comprising at least one of the foregoing.

Embodiment 8

The thermoplastic composition of embodiment 7, wherein the aromatic polyketone comprises polyetheretherketone.

Embodiment 9

The thermoplastic composition of any one or more of embodiments 1 or 4 to 8, wherein the thermoplastic composition comprises 45 to 60 weight percent of a polyetheretherketone.

Embodiment 10

The thermoplastic composition of any one or more of embodiments 1 to 3 and 5 to 9, wherein the thermoplastic composition comprises 4 to 10 weight percent kaolin clay having a particle diameter of 0.1-2 micrometers.

Embodiment 11

The thermoplastic composition of any one or more of embodiments 1 to 10, wherein the thermoplastic composition has an ITC toxicity value of less than or equal to 15, preferably less than or equal to 12, more preferably less than or equal to 10, as determined according to EN50305 test methods.

Embodiment 12

The thermoplastic composition of any one or more of embodiments 1 to 11, further comprising one or more additives comprising a thermal stabilizer, a hydrolysis stabilizer, a nucleating agent, a metal deactivator, a flame retardant additive, or a combination comprising at least one of the foregoing.

Embodiment 13

The thermoplastic composition of any one or more of embodiments 1 to 12, wherein the composition has a siloxane content of 1 to 25 percent by weight, based on the combined weight of the polymer components.

Embodiment 14

An electrical wire comprising a conductor wire and a covering disposed over the conductor wire, wherein the covering comprises the thermoplastic composition of any one or more of embodiments 1 to 13; and the thermoplastic composition coating the conductor wire has one or more of the following properties: a tensile stress of greater than 30 MPa, determined according to UL-1581 after 24 hours at 23° C.; and a tensile elongation of greater than 100%, determined according to UL-1581 after 24 hours at 23° C.

Embodiment 15

The electrical wire of embodiment 14, wherein the thermoplastic composition coating the conductor wire has one or more of the following properties: a tensile stress of greater than 30 MPa, determined according to UL-1581 after heat aging for 168 hours at 158° C.; a tensile elongation of greater than 100%, determined according to UL-1581 after heat aging for 168 hours at 158° C.; a tensile stress of greater than 30 MPa, determined according to UL-1581 after heat aging for 168 hours at 180° C.; or a tensile elongation of greater than 100%, determined according to UL-1581 after heat aging for 168 hours at 180° C.; and wherein the electrical wire achieves a pass rating in the single wire vertical flame propagation test conducted according to EN50265-2-1/IEC60332-1.

Embodiment 16

The electrical wire of any one or more of embodiments 14 to 15 wherein the thermoplastic composition has a tear strength of greater than 20 N/mm, preferably greater than 25 N/mm, determined according to ISO 34-1 in the presence of the conductor wire.

Embodiment 17

The electrical wire of any one or more of embodiments 14 to 16, wherein the electrical wire achieves a pass rating in the single wire burn test conducted according to UL-1581.

Embodiment 18

The electrical wire of any one or more of embodiments 14 to 17, wherein the electrical wire can have an ITC toxicity value of less than 15, or less than 10, measured according to EN50305.

Embodiment 19

The electrical wire of any one or more of embodiments 14 to 18, wherein the conductor wire comprises copper, aluminum, lead, gold, silver, iron, nickel, chromium, or an alloy comprising at least one of the foregoing, preferably copper.

Embodiment 20

The electrical wire of any one or more of embodiments 14 to 19, wherein the wire has a thickness of 0.1 to 1 millimeter.

Embodiment 21

An article comprising the electrical wire of any one or more of embodiments 14 to 20.

Embodiment 22

The article of embodiment 21, wherein the article is a construction component, a building component, an electrical device component, a railway vehicle component, an automobile component, a bus component, a marine vehicle component, or an aircraft component.

Embodiment 23

An article comprising the thermoplastic composition of any one or more of embodiments 1 to 13.

Embodiment 24

The article of embodiment 23, wherein the article is a construction component, a building component, an electrical device component, a railway vehicle component, an automobile component, a bus component, a marine vehicle component, or an aircraft component.

In general, the thermoplastic compositions, electrical wires, and articles made therefrom can alternatively comprise, consist of, or consist essentially of, any appropriate components herein disclosed. The compositions, methods and articles can additionally, or alternatively, be formulated so as to be devoid, or substantially free, of any components, materials, ingredients, adjuvants, steps, or species used in the prior art compositions or methods that are otherwise not necessary to the achievement of the function or objectives of the present invention.

All ranges disclosed herein are inclusive of the endpoints, and the endpoints are independently combinable with each other. "Combination" is inclusive of blends, mixtures, alloys, reaction products, and the like. "Or" means "and/or." Furthermore, the terms "first," "second," and the like, herein do not denote any order, quantity, or importance, but rather are used to denote one element from another. The terms "a" and "an" and "the" herein do not denote a limitation of quantity, and are to be construed to cover both the singular and the plural, unless otherwise indicated herein or clearly contradicted by context. It is to be understood that the described elements may be combined in any suitable manner in the various embodiments.

As used herein, the term "hydrocarbyl" includes groups containing carbon, hydrogen, and optionally one or more heteroatoms (e.g., 1, 2, 3, or 4 atoms such as halogen, O, N, S, P, or Si). "Alkyl" means a branched or straight chain, saturated, monovalent hydrocarbon group, e.g., methyl, ethyl, i-propyl, and n-butyl. "Alkylene" means a straight or branched chain, saturated, divalent hydrocarbon group (e.g., methylene ($-CH_2-$) or propylene ($-(CH_2)_3-$)). "Alkenyl" and "alkenylene" mean a monovalent or divalent, respectively, straight or branched chain hydrocarbon group having at least one carbon-carbon double bond (e.g., ethenyl ($-HC=CH_2$) or propenylene ($-HC(CH_3)=CH_2-$). "Alkynyl" means a straight or branched chain, monovalent hydrocarbon group having at least one carbon-carbon triple bond (e.g., ethynyl). "Alkoxy" means an alkyl group linked via an oxygen (i.e., alkyl-O—), for example methoxy, ethoxy, and sec-butyloxy. "Cycloalkyl" and "cycloalkylene" mean a monovalent and divalent cyclic hydrocarbon group, respectively, $-C_nH_{2n-x}$ and $-C_nH_{2n-2x}-$ wherein x is the number of cyclization(s). "Aryl" means a monovalent, monocyclic or polycyclic aromatic group (e.g., phenyl or naphthyl). "Arylene" means a divalent, monocyclic or polycyclic aromatic group (e.g., phenylene or naphthylene). The prefix "halo" means a group or compound including one more halogen (F, Cl, Br, or I) substituents, which can be the same or different. The prefix "hetero" means a group or compound that includes at least one ring member that is a heteroatom (e.g., 1, 2, or 3 heteroatoms, wherein each heteroatom is independently N, O, S, or P. "Substituted" means that the compound or group is substituted with at least one (e.g., 1, 2, 3, or 4) substituents instead of hydrogen, where each substituent is independently nitro ($-NO_2$), cyano ($-CN$), hydroxy ($-OH$), halogen, thiol ($-SH$), thiocyano ($-SCN$), $C_{1-6}$ alkyl, $C_{2-6}$ alkenyl, $C_{2-6}$ alkynyl, $C_{1-6}$ haloalkyl, $C_{1-9}$ alkoxy, $C_{1-6}$ haloalkoxy, $C_{3-12}$ cycloalkyl, $C_{5-18}$ cycloalkenyl, $C_{6-12}$ aryl, $C_{7-13}$ arylalkylene (e.g, benzyl), $C_{7-12}$ alkylarylene (e.g, toluyl), $C_{4-12}$ heterocycloalkyl, $C_{3-12}$ heteroaryl, $C_{1-6}$ alkyl sulfonyl ($-S(=O)_2$-alkyl), $C_{6-12}$ arylsulfonyl ($-S(=O)_2$-aryl), or tosyl ($CH_3C_6H_4SO_2-$), provided that the substituted atom's normal valence is not exceeded, and that the substitution does not significantly adversely affect the manufacture, stability, or desired use of the compound. When a compound is substituted, the indicated number of carbon atoms is the total number of carbon atoms in the group, including those of the substituent(s).

All cited patents, patent applications, and other references are incorporated herein by reference in their entirety. While particular embodiments have been described, equivalents that are or may be presently unforeseen may arise to applicants or others skilled in the art. Accordingly, the appended claims as filed and as they may be amended are intended to embrace all such equivalents.

What is claimed is:

1. A thermoplastic composition comprising, based on the total weight of the composition,
    25 to less than 95 weight percent poly(etherimide-siloxane) copolymer having a siloxane content of more than 0 to less than 50 weight percent based on the total weight of the poly(etherimide-siloxane) copolymer;
    5-75 weight percent of an aromatic polyketone; and
    greater than 0 to 15 weight percent of a mineral filler comprising kaolin clay, talc, or a combination comprising at least one of the foregoing, wherein the mineral filler has a particle diameter of 0.1 to 2 micrometers;
    wherein the thermoplastic composition has a lower toxicity index than the same thermoplastic composition not including the aromatic ketone, the mineral filler, or both, as determined in accordance with EN 53505, or a lower HCN/benzene ratio than the same thermoplastic composition not including the aromatic polyketone, the mineral filler, or both.

2. A thermoplastic composition comprising, based on the total weight of the composition,
- 25 to less than 100 weight percent of a poly(etherimide-siloxane) copolymer having a siloxane content of more than 0 to less than 50 weight percent based on the total weight of the poly(etherimide-siloxane) copolymer; and
- greater than 0 to 15 weight percent of a mineral filler comprising kaolin clay, talc, or a combination comprising at least one of the foregoing, wherein the mineral filler has a particle diameter of 0.1 to 2 micrometers;
- wherein the thermoplastic composition has a lower toxicity index than the same thermoplastic composition not including the mineral filler, as determined in accordance with EN 53505, or a lower HCN/benzene ratio than the same thermoplastic composition not including the mineral filler.

3. The thermoplastic composition of claim 1, wherein the thermoplastic composition has one or more of the following properties:
- a flexural modulus of 150 to 3000 MPa, determined according to ASTM D790;
- a flexural strength of greater than 50 MPa, determined according to ASTM D790;
- a Shore D hardness of greater than 75, determined according to ASTM D1238;
- a tensile modulus of greater than 2500 MPa, determined according to ASTM D638;
- a tensile strength of greater than 20 MPa, determined according to ASTM D638;
- a tensile elongation of greater than 10%, determined according to ASTM D638 at 23° C.;
- a melt flow rate of 5 to 150 g/10 minutes, determined according to ASTM D1238; or
- a tear strength of greater than 20 N/mm, determined according to ISO 34-1.

4. The thermoplastic composition of claim 1, wherein the aromatic polyketone comprises polyetherketone, polyetheretherketone, polyetherketoneketone, polyaryletherketone, or a combination comprising at least one of the foregoing.

5. The thermoplastic composition of claim 1, wherein the thermoplastic composition comprises 45 to 60 weight percent of a polyetheretherketone.

6. The thermoplastic composition of claim 1, wherein the thermoplastic composition comprises 4 to 10 weight percent kaolin clay.

7. The thermoplastic composition of claim 1, wherein the thermoplastic composition has an ITC toxicity value of less than or equal to 15, as determined according to EN50305 test methods.

8. The thermoplastic composition of claim 1, wherein the composition has a siloxane content of 1 to 25 percent by weight, based on the combined weight of the polymer components.

9. An electrical wire comprising a conductor wire and a covering disposed over the conductor wire, wherein
- the covering comprises the thermoplastic composition of claim 1; and
- the thermoplastic composition coating the conductor wire has one or more of the following properties:
  - a tensile stress of greater than 30 MPa, determined according to UL-1581 after 24 hours at 23° C.; and
  - a tensile elongation of greater than 100%, determined according to UL-1581 after 24 hours at 23° C.

10. The electrical wire of claim 9, wherein the thermoplastic composition coating the conductor wire has one or more of the following properties:
- a tensile stress of greater than 30 MPa, determined according to UL-1581 after heat aging for 168 hours at 158° C.;
- a tensile elongation of greater than 100%, determined according to UL-1581 after heat aging for 168 hours at 158° C.;
- a tensile stress of greater than 30 MPa, determined according to UL-1581 after heat aging for 168 hours at 180° C.; or
- a tensile elongation of greater than 100%, determined according to UL-1581 after heat aging for 168 hours at 180° C.; and
- wherein the electrical wire achieves a pass rating in the single wire vertical flame propagation test conducted according to EN50265-2-1/IEC60332-1.

11. The electrical wire of claim 9 wherein the thermoplastic composition has a tear strength of greater than 20 N/mm, determined according to ISO 34-1 in the presence of the conductor wire.

12. The electrical wire of claim 9, wherein the electrical wire achieves a pass rating in the single wire burn test conducted according to UL-1581.

13. The electrical wire of claim 9, wherein the electrical wire can have an ITC toxicity value of less than 15, measured according to EN50305.

14. The electrical wire of claim 9, wherein the conductor wire comprises copper, aluminum, lead, gold, silver, iron, nickel, chromium, or an alloy comprising at least one of the foregoing.

15. The electrical wire of claim 9, wherein the wire has a thickness of 0.1 to 1 millimeter.

16. An article comprising the electrical wire of claim 9.

17. The article of claim 16, wherein the article is a construction component, a building component, an electrical device component, a railway vehicle component, an automobile component, a bus component, a marine vehicle component, or an aircraft component.

18. An article comprising the thermoplastic composition of claim 1.

19. The thermoplastic composition of claim 2, wherein the thermoplastic composition comprises 4 to 10 weight percent kaolin clay.

* * * * *